United States Patent [19]

Reid et al.

[11] 4,277,830
[45] Jul. 7, 1981

[54] DIAGNOSIS OF ENGINE TURBOCHARGER PERFORMANCE

[75] Inventors: David L. Reid; Dennis O. Taylor, both of Columbus, Ind.

[73] Assignee: Cummins Engine Company, Inc., Columbus, Ind.

[21] Appl. No.: 47,055

[22] Filed: Jun. 11, 1979

[51] Int. Cl.³ ............................................ G01M 15/00
[52] U.S. Cl. .................................. 364/431; 364/511; 364/551; 73/116
[58] Field of Search ...................... 364/551, 431, 511; 73/118, 116, 119 A, 119 R

[56] References Cited

U.S. PATENT DOCUMENTS

| 3,750,465 | 8/1973 | Howell et al. | 364/431 X |
| 3,750,465 | 8/1973 | Howell et al. | 364/506 X |
| 4,046,003 | 9/1977 | Armstrong et al. | 364/431 X |
| 4,050,296 | 9/1977 | Benedict | 73/116 |
| 4,061,025 | 12/1977 | Willenbecher et al. | 73/116 |
| 4,088,109 | 5/1978 | Woodruff et al. | 364/431 X |
| 4,124,142 | 2/1979 | Scott | 73/119 A X |
| 4,128,005 | 12/1978 | Arnston et al. | 364/431 X |
| 4,140,087 | 2/1979 | Daumer et al. | 364/431 X |
| 4,179,922 | 12/1979 | Bouverie | 73/116 |

Primary Examiner—Edward J. Wise
Attorney, Agent, or Firm—Merriam, Marshall & Bicknell

[57] ABSTRACT

This disclosure relates to a system for analyzing the performance of a reciprocating piston, internal combustion engine such as a diesel engine. Sensors are connected to the engine, which respond to various operating parameters, and signals representing the parameters are fed to computer processing equipment. Two of the parameters are the intake manifold pressure and the engine speed. A turbocharger of the engine includes a turbine that is driven by the engine exhaust and a compressor that delivers air to the intake manifold. The performance of the turbocharger is tested by stabilizing the engine and the turbocharger at no-load, low-idle speed, quickly accelerating the engine to maximum governed speed, and determining how the turbocharger stabilizes after the engine stabilizes at the maximum speed.

7 Claims, 7 Drawing Figures

Fig_2.

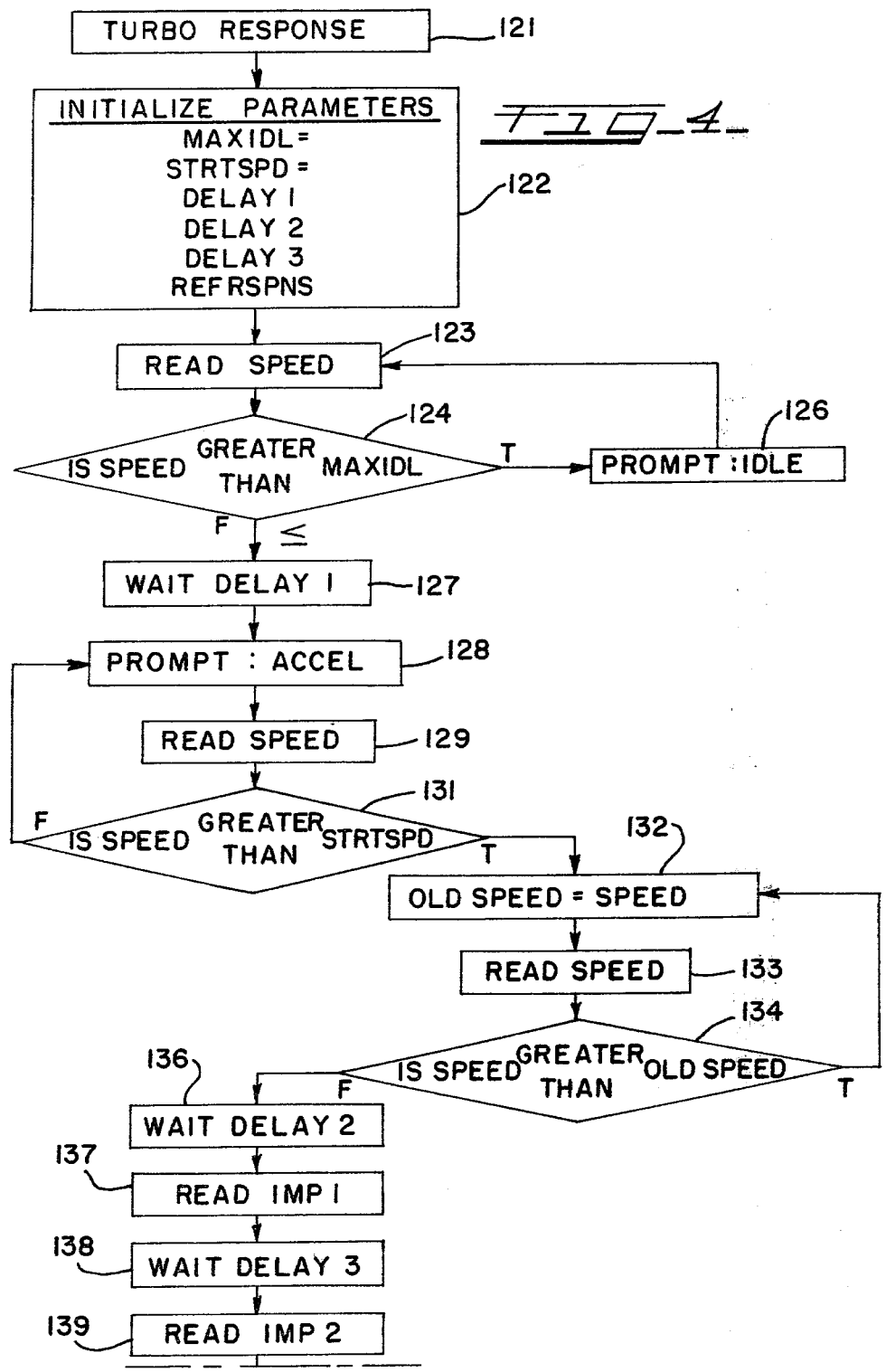

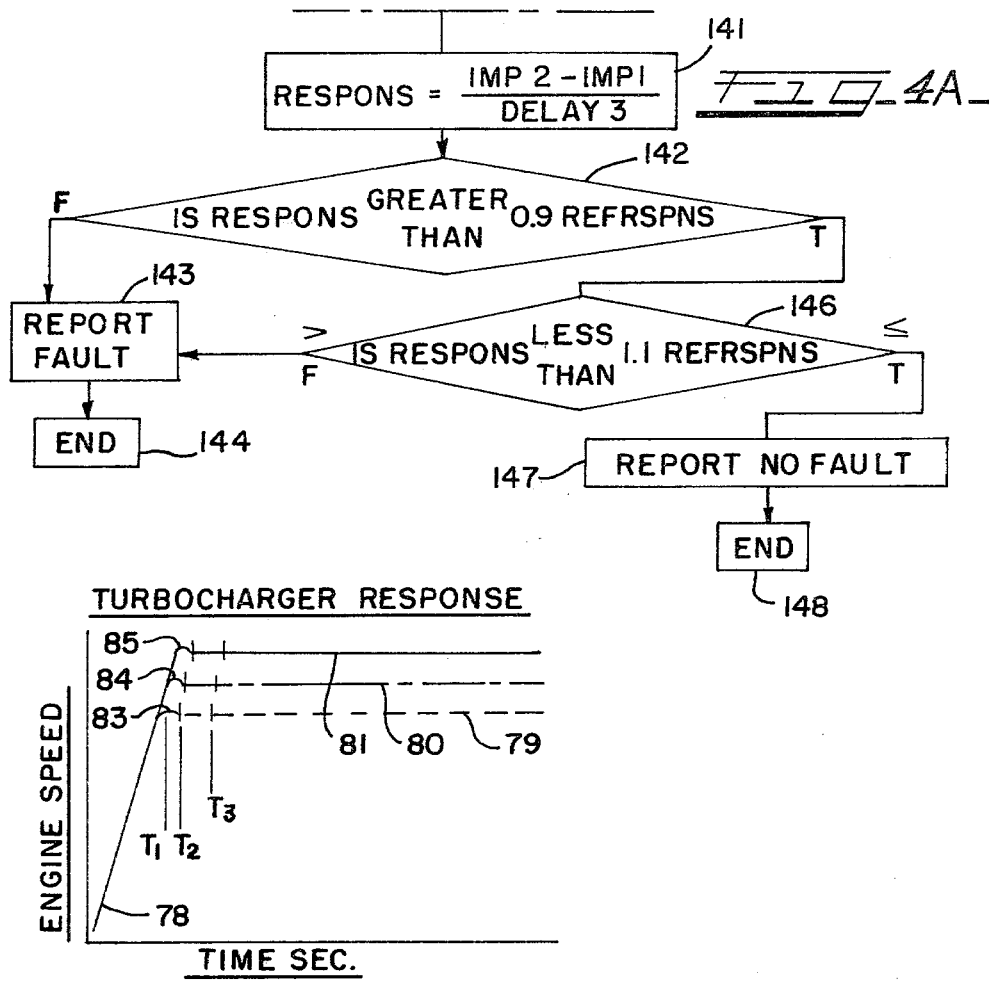
FIG. 4A
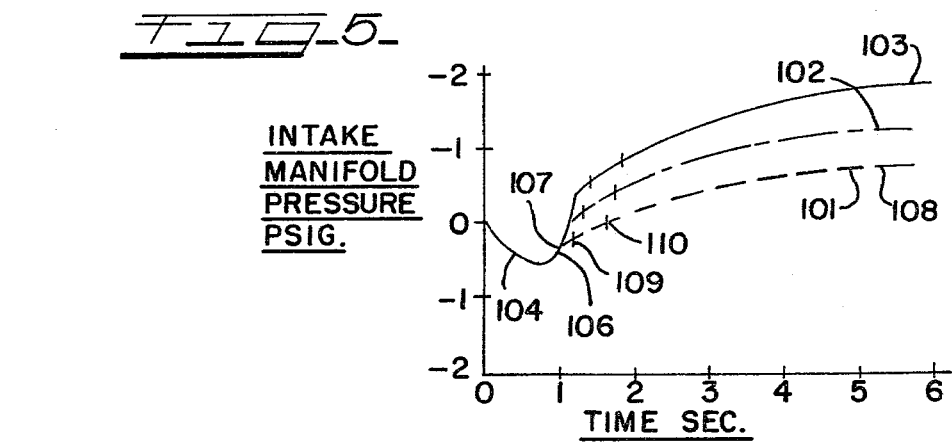
FIG. 5
FIG. 6

DIAGNOSIS OF ENGINE TURBOCHARGER PERFORMANCE

Internal combustion engines, particularly diesel engines, are increasingly being provided with turbochargers to improve their operation. It is, of course, important that the turbochargers perform satisfactorily, otherwise the engine will not meet performance specifications or it may even be damaged. Arrangements have been suggested in the prior art for testing turbochargers for such faults as mechanical drag between parts and improper component mixing. By the latter, it is meant that, for example, a turbine casing or compressor housing may be used with a rotor for which it was not designed.

Prior art testing arrangements have included means for detecting the turbocharger rotor RPM at different engine speeds and loads and measuring the pressure differential between the intake and exhaust manifold pressure at different engine conditions. U.S. Pat. No. 4,046,003 discloses an arrangement for sensing the compressor output pressure and determining the rate of change of pressure with respect to time as the engine is accelerated. The patent further discloses reporting the maximum change in pressure per unit of time.

There are a number of disadvantages of the prior art arrangements. There are many different maximum governed speed settings and characteristics of fuel governors and the system shown in the patent is susceptible to error because it cannot take into account such differences. The system of the above patent operates on an average fuel governor setting which is not satisfactory. Further, the system is subject to error due to engine fuel governor faults. The tests are performed during engine acceleration, which is not a period when the fuel input may be accurately controlled and repeatable.

It is a general object of the present invention to provide a new and improved apparatus and method for testing the performance of a turbocharger of an engine. Advantages of the applicants' invention are that the measurements are more accurate because they are taken during accurately controlled fuel input conditions, and measurements may be taken under repeatable conditions. Further, the amount of reference data is reduced.

In accordance with the present invention, a turbocharger of an internal combustion engine is tested by the steps of stabilizing the engine and the turbocharger at no-load, low-idle speed, sensing the air intake manifold pressure and the engine speed, quickly increasing the engine speed to maximum governed speed, and when the engine has stabilized at maximum governed speed, sensing the intake manifold pressure at the beginning and at the end of a time interval. The difference in pressures over a fixed time interval may be determined, or the length of the time interval required for the pressure to increase by a fixed amount may be measured.

Apparatus in accordance with the invention comprises means for sensing engine speed, means for sensing the air pressure in the intake manifold and the compressor outlet, means for sensing when the engine has reached maximum governed speed after having been quickly accelerated, means providing a time interval, and means for determining said air pressure at the beginning and at the end of the time interval.

The foregoing and other objects and advantages of the present invention will be better understood from the following detailed description taken in conjunction with the accompanying figures of the drawings, wherein:

FIGS. 4 and 4A are a flow chart showing the operation of the system; and

FIGS. 5 and 6 are curves illustrating the operation of the system.

DETAILED DESCRIPTION

Figure 1:
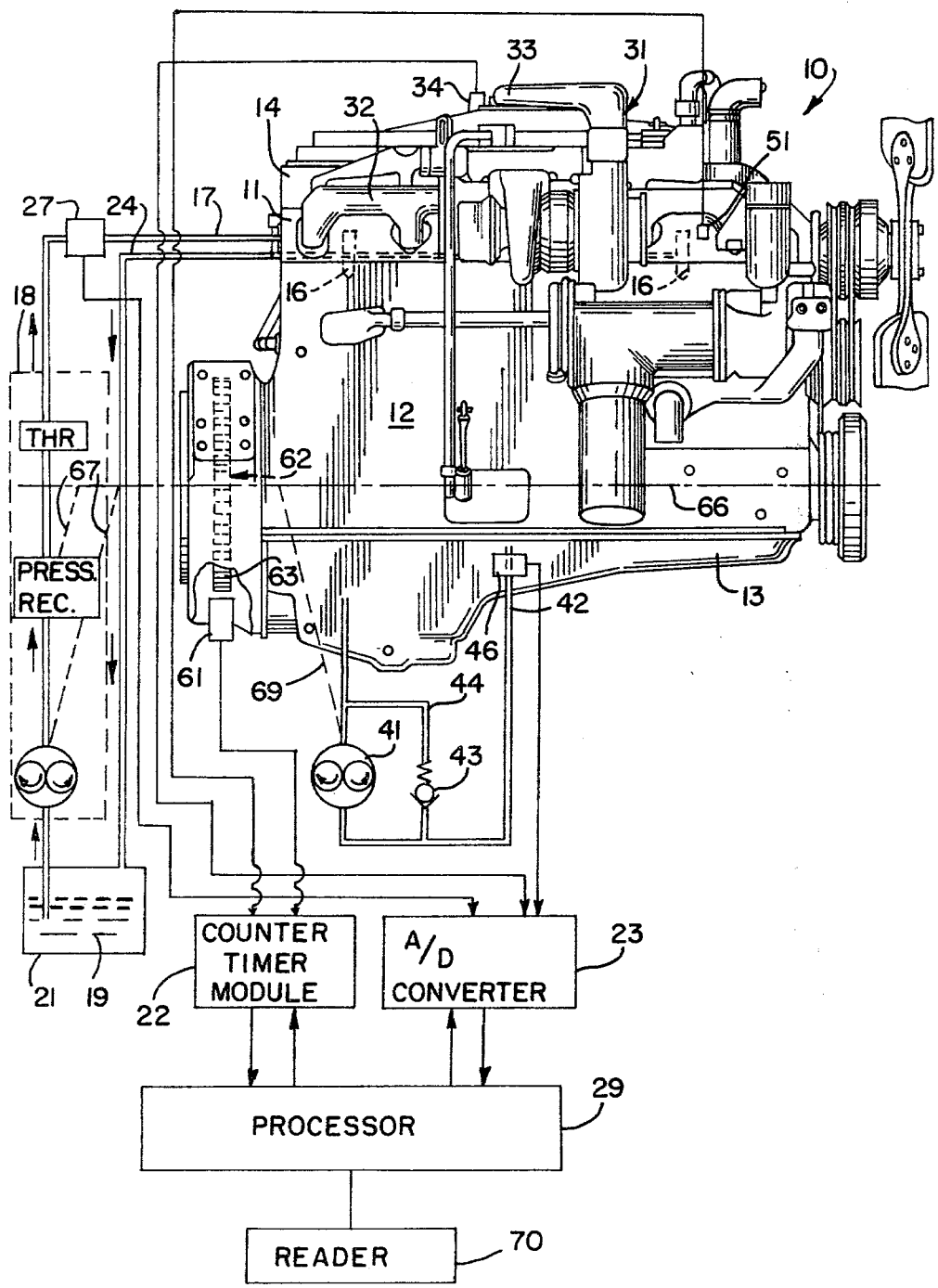
FIG. 1 is a view of an engine including a system in accordance with the present invention.

With reference to FIG. 1, an engine 10 is illustrated which may be a standard internal combustion engine such as the NH series, six cylinder, in-line reciprocating piston, diesel engine manufactured by Cummins Engine Company, Inc. Such an engine includes a head 11, a block 12, an oil pan 13 and a rocker housing 14 fastened to the upper side of the head 11. The pistons (not shown) of the engine reciprocate within cylinders (also not shown) and are connected to rotate a crankshaft 66. A flywheel on the crankshaft has a ring gear 62 attached to it; teeth 63 on the gear 62 being selectively engaged by a starter motor (not shown) for starting the engine.

A plurality of fuel injectors 16 inject metered quantities of fuel into the cylinders after inlet air within the cylinders has been compressed sufficiently to cause compression ignition of the resultant combustable mixture. The injectors 16 may be a unit type embodying the features of the injectors shown in U.S. Pat. No. 3,351,288. A common fuel supply rail 17 connects the injectors 16 with a fuel supply system including a fuel pump 18 of the character shown in the U.S. Pat. No. 3,139,875. The fuel pump 18 draws fuel 19 from a reservoir or fuel tank 21 and forms a regulated fuel source for the fuel supplied to the rail 17. A throttle is incorporated in the fuel pump 18 and permits the operator of the engine to regulate the fuel pressure delivered to the injectors. Also connected to each of the injectors 16 is a fuel return rail 24 which carries fuel from the injectors 16 to the tank 21.

The engine 10 further includes a turbocharger unit 31 which may have a conventional design. The unit 31 includes a turbine that receives engine exhaust from an exhaust manifold 32 and it further includes a compressor that is connected by a duct 33 to an air intake manifold of the engine.

The engine 10 further includes a lubricant system for circulating a lubricant such as oil through the various operating parts of the engine. The lubricant system includes a pump 41 that draws the lubricant from a reservoir in the crankcase and pan 13 and pumps the lubricant under pressure to a lubricant rifle passage 42 in the block. The pressure in the rifle 42 is regulated by a pressure regulator valve 43 connected in a bypass line 44 that is connected across the pump 41.

A number of mechanical couplings, illustrated by dashed lines in FIG. 1 and indicated by the reference numerals 67 and 69, connect the crankshaft 66 with the fuel pump 18 and the lubricant pump 41, respectively.

A diagnostic system in accordance with the present invention is provided, and includes a cycle event marker (CEM) sensor 51 which is preferably mounted in the rocker housing 14 and responds to the movement of an operating part of the engine. For example, the CEM sensor 51 may be a magnetic coil proximity type sensor that is mounted adjacent the rocker arm that actuates the injector 16 of the number one cylinder. This rocker arm pivots during injection which occurs toward the end of the compression stroke of the piston of the number one cylinder and this movement causes the sensor 51 to generate a CEM signal toward the end of the compression stroke of the piston of the number one cylinder. The CEM signal is utilized in testing engine parameters as will be subsequently described.

Figure 2:
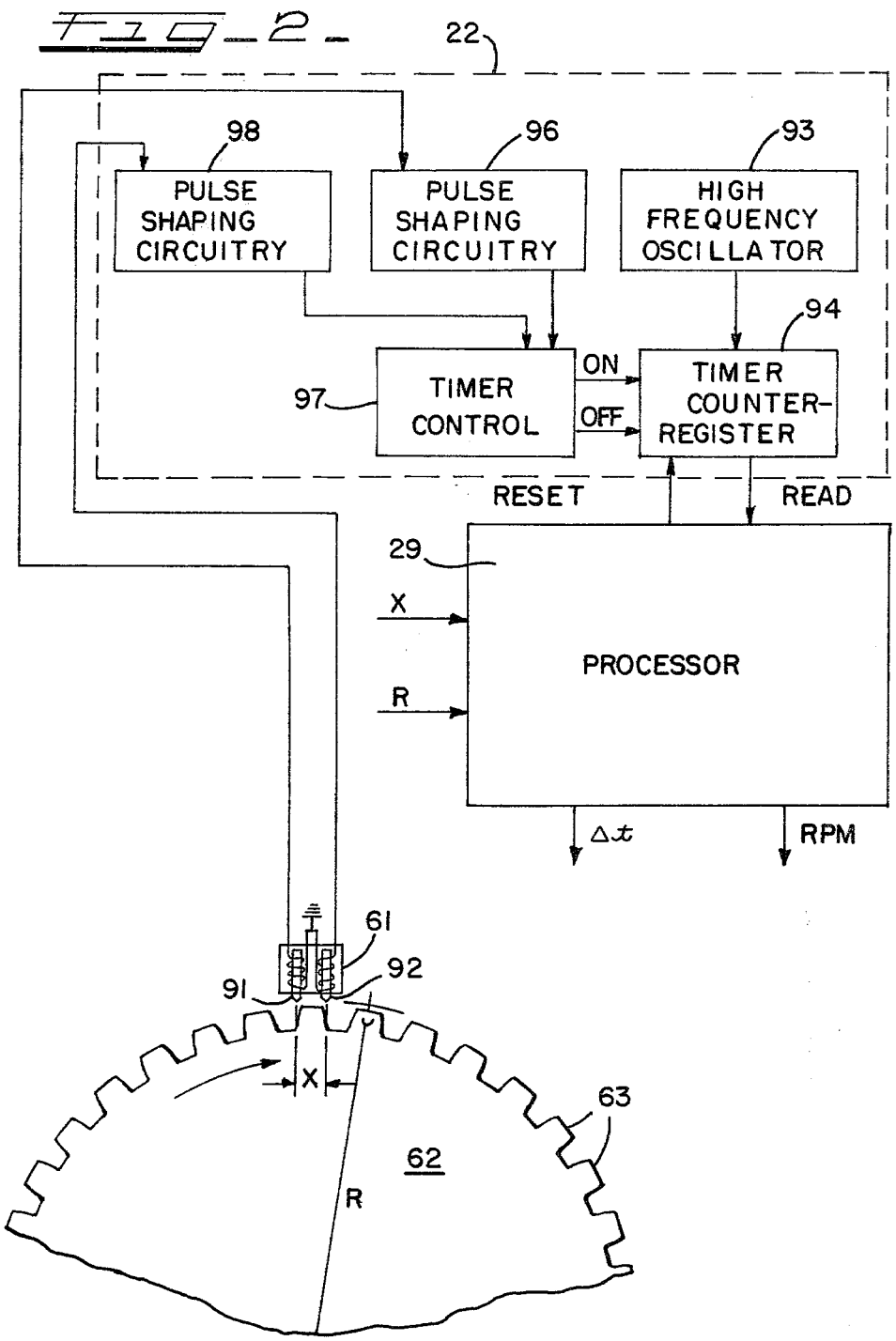
FIG. 2 is a block diagram showing a part of the system.

The diagnostic system still further includes an engine speed sensor 61 that is mounted adjacent to the outer periphery of the flywheel ring gear 62 of the engine 10. FIG. 2 illustrates an example of the sensor 61 and the circuits connected to it. The sensor 61 has two spaced elements 91 and 92 which in the present specific example, are variable reluctance magnetic sensors. The teeth 63, moving clockwise, generate signals first in the element 91 and then in the element 92. An oscillator 93 is connected to a counter 94 which is controlled by the tooth pulses from the elements. A pulse from the element 91 operates through circuits 96 and 97 to enable or start the counter 94 and a pulse from the element 92 operates through circuits 98 and 97 to disable or stop the counter. The count associated with each tooth is read by a processor 29. Each count is directly proportional to the time interval ($\Delta t$) for a tooth to move from one element 91 to the other element 92, and inversely proportional to instantaneous speed of the ring gear. A factor for converting counts read to engine RPM may be provided as an input to the processor 29 based on physical measurements, such as the spacing X between the elements 91 and 92 and the radius R of the elements 91 and 92 or may be computed within the processor based on signals from the cycle event marker.

The diagnostic system further includes a number of engine sensors including a fuel pressure sensor 27 connected in the rail 17, a lubricant pressure sensor 46 connected in the rifle passage 42, and an intake manifold air pressure sensor 34 connected in the intake manifold. The sensors 51 and 61 are connected to a counter-timer module 22 and the sensors 27, 34 and 46 are connected to an A/D convertor 23, the components 22 and 23 being connected to the processor 29. The processor 29 provides outputs to a readout device 70 which may provide, for example, visual indications and permanent records.

Figure 3:
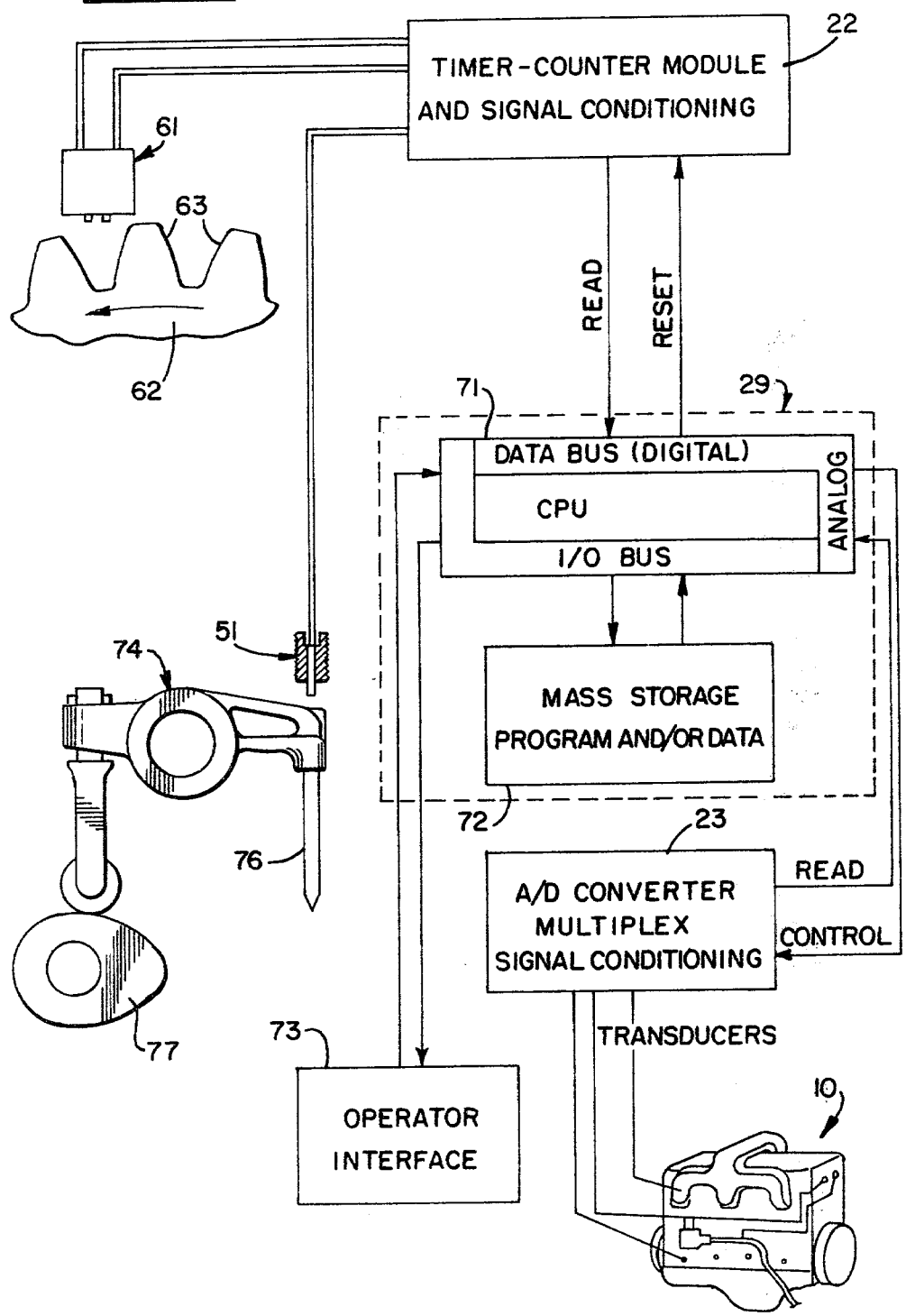
FIG. 3 is a block diagram of the system.

FIG. 3 illustrates the diagnostic system in greater detail. The processor 29 includes a processing unit 71 and a memory unit 72. An operator interface 73 is connected to the unit 71 and forms means whereby the operator may insert information and instructions and includes the readout 70. The CEM sensor 51 is shown mounted in a position to sense the movement of a rocker arm 74 for an injector plunger 76. A cam 77 moves the plunger 78 in an injunction stroke toward the end of the compression stroke.

The components 22, 23, 29 and 73 may comprise, for example, standardized products of Texas Instruments Company.

The curve indicated by the reference numeral 78 in FIG. 5 shows the variation in engine speed with time as engine accelerates when the throttle is snapped to full open position. It will be noted that the engine speed increases generally linearly during such acceleration, until the maximum governed speed is reached. FIG. 5 illustrates the operation of three engines having different governor maximum speed settings. The three speed settings or levels are indicated by the numerals 79, 80 and 81. The knees 83, 84 and 85 where the curve 78 intersects the curves 79, 80 and 81 are caused by overshoot of the governor.

With specific reference to FIG. 6, three different turbocharger characteristics 101, 102 and 103 are illustrated, which are respectively associated with the curves 79, 80 and 81. The intake manifold pressure drops, as indicated by the dip 104 of the pressure curve, during initial engine acceleration because the engine sucks air into the cylinders through the compressor. After the initial dip 104, the turbocharger starts to recover as the increased energy of the exhaust gases drive the turbine at an increasing speed. However, the time of the pressure increase, indicated by the numeral 106, lags behind the engine acceleration when the throttle is snapped to full open and the engine speed increases rapidly.

The point 107 where the curve 106 intersects the curve 101 corresponds to the knee 83 where the governor breaks. Whereas the engine acceleration stops, the turbine speed continues to increase gradually until it stabilizes in the curve area indicated by the numeral 108. The rate of recovery is a good indication of the performance or health of the turbocharger, and the intake manifold pressure change is proportional to the rate of recovery.

In accordance with the present invention, two time spaced samplings are taken of the intake manifold pressure at times $T_2$ and $T_3$ (FIG. 5) shortly after the engine has stabilized at maximum governed speed but before the turbocharger 31 has stabilized. The time $T_1$ (FIG. 5) is the time when the engine speed stops increasing and the slope of the speed-time curve is zero, and the times $T_2$ and $T_3$ are shortly after the time $T_1$. The two pressure measurements are made, using the sensor 34, at the times 109 and 110 (FIG. 6) and the rate of change of the pressure is compared with a reference or standard value.

The two curves 102 and 103 are similar to the curve 101 but are associated with the two speed curves 80 and 81. The curves 102 and 103 have higher pressure levels because of the higher maximum speeds of the engine, and the pressure sampling times $T_2$ and $T_3$ are later in time because the knees 84 and 85 are later.

The processor 29 shown in FIGS. 1 and 3 processes the information received from the sensors and from the operator, in accordance with the invention. The processor may be a general purpose computer programmed to automatically perform the described operations, and FIG. 4 is a flow chart illustrating a specific example of the method and the programmed operation. It should be understood that the invention is not limited to specific example which is given merely to facilitate the description of the invention.

The signal from the sensor 34 and the converter 23 are received at step 121 and various system parameters are initially set in the system at step 122. The parameters include MAXIDL which is the highest idle speed permitted prior to execution of the test; STRTSPD which is the engine threshold speed employed to varify that the engine is accelerating; DELAY 1 which is a time delay (such as 10 seconds) to allow engine conditions to stabilize at low idle speed; DELAY 2 which is a time delay (such as 100 msec) to allow the engine to stabilize at maximum governed speed; DELAY 3 which is a time delay (such as 200 msec) between samplings of the intake manifold pressure (IMP); and REFRSPNS which is a nominal reference response for a no fault turbocharger, or a comparison value derived from a satisfactory turbocharger. The engine speed referred to is the engine crankshaft speed. In an engine where the maximum governed speed is about 2400 rpm, the MAXIDL speed is about 750–800 rpm and the STRTSPD is about 1600 rpm. The test is preferably performed under no-load conditions so that a dynamometer is not required.

At step 123, the engine speed is sensed and compared at step 124 with MAXIDL, and if it is greater, the operator is prompted at step 126 to adjust the engine for idle speed operation. The prompt may be on the operator interface 73 (FIG. 3) which may be a hand-held control unit. When the sensed speed is not greater than MAXIDL, the method proceeds to step 127 which is a delay to allow the engine and turbocharger to stabilize. At the end of DELAY 1, the operator is prompted at step 128 to accelerate the engine and in step 129 the speed is monitored during acceleration. In step 131 the speed is compared with STRTSPD, and when it is greater, the method proceeds to steps 132, 133 and 134. In these three steps, a series of speed readings are taken and each new reading is compared with the preceeding reading. The method cycles through steps 132, 133 and 134 as long as each new reading is higher than the immediately preceeding reading. When a reading is not greater than the previous reading, indicating that engine speed has leveled off at the knee 83 (time $T_1$) FIG. 5, the method proceeds to step 136 for DELAY 2 which is the time between $T_1$ and $T_2$. At the end of DELAY 2, the intake manifold pressure (IMP) is read at step 137, which is at point 109 in FIG. 6. At step 138, there is time DELAY 3 which is the time between $T_2$ and $T_3$, and at step 139 IMP is read again at point 110.

At step 141, the two pressure readings are subtracted and divided by DELAY 3 to obtain the response or the rate of change of pressure. At the next step 142, the response is compared with the reference REFRSPNS. In the present example, if the response is at least 0.9 of the reference value, the turbocharger under test is considered satisfactory. If the response is less than 0.9 of the reference, the method proceeds to steps 143 and 144 where a fault is indicated and the routine ends. If the response is greater than 0.9, the method proceeds to step 146 where the response is compared with 1.1 REFRSPNS to determine whether the response is excessive. If the response is greater than 1.1 of the reference, the method branches to steps 143 and 144. If the response is in the window between 0.9 and 1.1 REFRSPNS, the method proceeds to steps 147 and 148 when a no fault condition is indicated and the routine ends.

The system and method described herein are preferably included with a number of other tests performed in various engine parameters, utilizing the sensors described in connection with FIG. 1.

It will be apparent from the foregoing that a turbocharger test in accordance with the present invention may be quickly and accurately performed. Only a single acceleration run is required, and the air pressure readings are taken at times when the other engine operating conditions are stabilized. Consequently, variations in engine fuel pump governors are not a factor, and the fuel input is a relatively constant and controlled value while the measurements are being taken.

We claim:

1. The method of testing the response of a turbocharger of an internal combustion engine, comprising the steps of sensing the engine speed and the intake manifold air pressure, stabilizing the engine and the turbocharger at a speed below maximum governed speed, rapidly accelerating the engine to maximum governed speed, taking first and second measurements of the pressure after the ending has stabilized at maximum governed speed but before the turbocharger has stabilized.

2. The method of claim 1, wherein said first and second measurements are separated by a time interval, and further including the step computing the rate of change of the pressure over said time interval.

3. The method of claim 1, wherein said first and second measurements are separated by a time interval, and further including the step of subtracting said first and second measurements to obtain a pressure difference, and dividing said difference by said time interval to obtain said response.

4. The method of claim 1, and further including the step of comparing said response with a reference value representing a satisfactory performance.

5. Apparatus for testing a turbocharger of an internal combustion engine, comprising speed sensor means responsive to engine speed, pressure sensor means responsive to intake manifold pressure, and processor means responsive to said speed and pressure for determining when said engine has stabilized at maximum governed speed after a period of rapid acceleration, and for taking first and second time spaced pressure measurements after said engine has stabilized but before said turbocharger has stabilized.

6. Apparatus as in claim 5, wherein said processor means includes means for subtracting said first and second pressure measurements to obtain a difference.

7. Apparatus as in claim 6, wherein said processor means further includes means for comparing said difference with a reference value.

* * * * *